United States Patent
Oustric et al.

(10) Patent No.: US 10,021,892 B2
(45) Date of Patent: Jul. 17, 2018

(54) SNACK-TYPE DRY CHEESE OR DAIRY FOODSTUFF AND ITS PROCESS OF MANUFACTURE

(71) Applicant: Bongrain SA, Viroflay (FR)

(72) Inventors: Claude Oustric, Chartainvilliers (FR); Didier Beudon, Rambouillet (FR)

(73) Assignee: Bongrain SA, Viroflay (FR)

( * ) Notice: Subject to any disclaimer, the term of this patent is extended or adjusted under 35 U.S.C. 154(b) by 0 days.

(21) Appl. No.: 14/574,679

(22) Filed: Dec. 18, 2014

(65) Prior Publication Data
US 2015/0173384 A1 Jun. 25, 2015

(30) Foreign Application Priority Data

Dec. 20, 2013 (FR) .................. 13 63224
Jun. 13, 2014 (FR) .................. 14 55440

(51) Int. Cl.
*A23C 19/086* (2006.01)
*A23C 19/09* (2006.01)
*A23C 19/06* (2006.01)
*A23C 19/08* (2006.01)

(52) U.S. Cl.
CPC ......... *A23C 19/086* (2013.01); *A23C 19/06* (2013.01); *A23C 19/08* (2013.01); *A23C 19/09* (2013.01); *A23C 19/0912* (2013.01)

(58) Field of Classification Search
CPC ..... A23C 19/14; A23C 19/09; A23C 19/0912; A23C 19/086; A23C 1/08; A23C 1/14
USPC ........................................... 426/582
See application file for complete search history.

(56) References Cited

U.S. PATENT DOCUMENTS

| | | | |
|---|---|---|---|
| 4,719,118 A | 1/1988 | Thomas | |
| 4,803,090 A * | 2/1989 | Schlipalius | A23C 19/084 426/242 |
| 4,917,905 A * | 4/1990 | Guy | A23C 19/052 426/39 |
| 2001/0033879 A1* | 10/2001 | Hunt | A23C 19/032 426/36 |
| 2005/0031758 A1* | 2/2005 | Scharfman | A23C 19/086 426/582 |
| 2005/0249854 A1* | 11/2005 | Merrill | A23C 19/084 426/582 |
| 2006/0083842 A1 | 4/2006 | Miller | |
| 2010/0104726 A1 | 4/2010 | Richardson et al. | |
| 2013/0164429 A1* | 6/2013 | Stromotich | A23C 19/0912 426/582 |

FOREIGN PATENT DOCUMENTS

FR  2 750 015 A1  12/1997
WO  WO 2012/034218 A2  3/2012
(Continued)

OTHER PUBLICATIONS

Matheson: Nitrogen Specification Sheet, available at https://web.archive.org/web/20130607130901/http://www.mathesongas.com/pdfs/products/Nitrogen-Pure-Gas.pdf as of Jun. 7, 2013.*

(Continued)

*Primary Examiner* — Jeffrey Mornhinweg
(74) *Attorney, Agent, or Firm* — Alston & Bird LLP

(57) ABSTRACT

The present invention relates to a snack-type dry cheese or dairy foodstuff and to its process of manufacture.

10 Claims, 4 Drawing Sheets

(56) References Cited

FOREIGN PATENT DOCUMENTS

WO   WO 2013/039410 A1   3/2013
WO   WO 2013/104749 A1   7/2013

OTHER PUBLICATIONS

Girard, F. and Boyaval, P., "Carbon dioxide measurement in Swiss-type cheese by coupling extraction and gas chromatography," Lait, 74, 389-398 (1994).*
Search Report for French Application No. FR 1363224 dated Sep. 10, 2014.
"GROK—Grokkanti delizie con Grana Panado". (May 16, 2011), XP055167948 [X] 9-11 * the whole document *. Retrieved Oct. 30, 2016 via the Internet Archive Wayback Machine, available at URL: <https://web.archive.org/web/20160315171714/http://grok.it/en/discover-us/pdf/brochure.pdf>, 12 pages.
Khraisheh et al. "Quality and structural changes in starchy foods during microwave and convective drying." Food Research International, 37, (2004), pp. 497-503.
McMinn et al. "Modelling the mass transfer during convective, microwave and combined microwave-convective drying of solid slabs and cylinders." Food Research International, 36, Jan. 2003, pp. 977-983.
S. Chandrasekaran, et al. "Microwave food processing—a review." Department of Chemical Engineering, Indian Institute of Technology Madras, Chennai 600 036, India, 75 pages.
European Search Report for European Application No. 14198365.0 dated Mar. 27, 2015, 11 pages.

\* cited by examiner

SNACK-TYPE DRY CHEESE OR DAIRY FOODSTUFF AND ITS PROCESS OF MANUFACTURE

FIELD

The present invention relates to the field of the food industry; it is targeted more particularly at a snack-type dry cheese or dairy foodstuff and at its process of manufacture.

BACKGROUND

A large variety of snack-type foodstuffs exist on the market; snack-type foodstuff is understood to mean foods of small size, that is to say representing an individual portion which can be ingested in one or more mouthfuls and which is generally intended to be consumed with the fingers. The majority of commercially available, dry, snack-type foodstuffs with a savoury taste are essentially composed of carbohydrates, of added flavourings and of fats (such as crisps, blown or extruded products); they are of very limited nutritional value, which is why the consumption of this type of product is often criticized.

SUMMARY

The Applicant has developed a novel snack-type dry cheese foodstuff which is prepared exclusively from cheese or from a cheese speciality product. Surprisingly, the Applicant has succeeded in transforming, by an original process, cut pieces of low-fat cooked pressed cheese into a hollow-shaped expanded dry snack having a crunchy texture; the preparation of this novel product does not require addition of an additional ingredient; the foodstuff obtained is very dry, rehydrates very little and thus retains a crunchy texture and the desired effect in the mouth.

With the help of this process, the Applicant has subsequently developed a novel dry dairy foodstuff prepared from a mixture of dairy products; like the dry cheese foodstuff, this dry dairy foodstuff is provided in the form of an expanded and crunchy snack which may differ from the dry cheese foodstuff in its colour, its taste, which is naturally a neutral milky taste to which flavourings may be added, and its composition.

DETAILED DESCRIPTION

Figure 1:
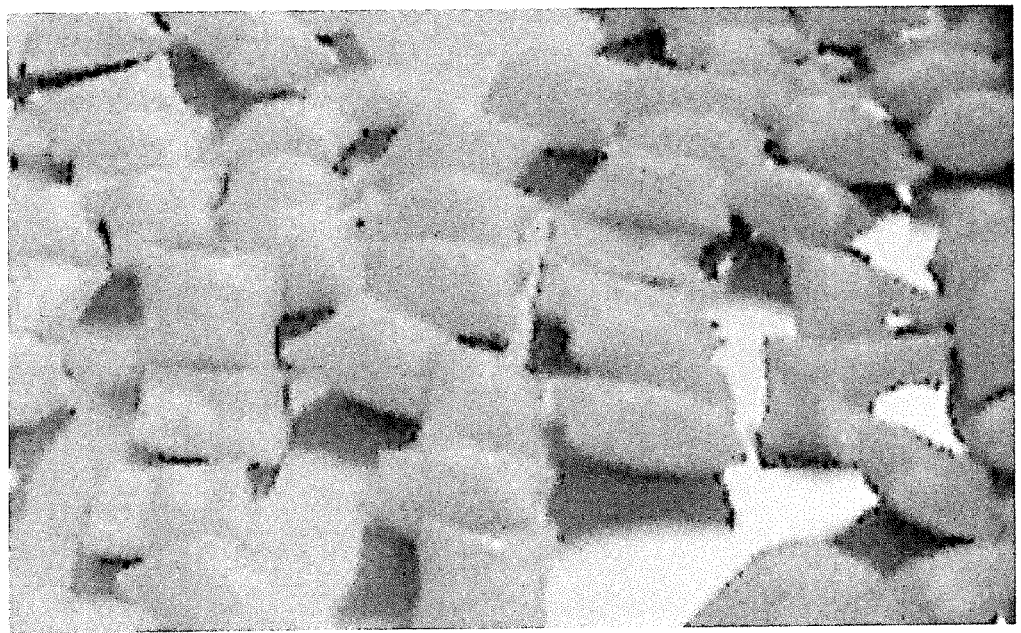
FIGS. 1 and 2 are photographs of dry cheese foodstuffs according to the invention which respectively have a rectangular profile and a triangular profile.

A subject-matter of the present invention is thus a process for the manufacture of a dry cheese or dairy foodstuff, also denoted by finished product in that which follows, comprising the following stages:

a) Freezing a cheese or a dairy mixture down to a temperature of less than or equal to −20° C.; the said cheese or the said dairy mixture has a fat content of less than or equal to 40% by weight; this fat content is expressed with respect to the weight of cheese or dairy mixture initially employed and corresponds to a fat content of less than or equal to 40 g/100 g of cheese or dairy mixture initially employed; preferably, this fat content is between 3% and 25% by weight and more preferably between 5% and 16% by weight, and said cheese or dairy mixture is prepared beforehand in slices having a thickness of less than or equal to 4 mm, preferably of between 0.1 and 2 mm and more preferably of between 0.5 and 1.5 mm;

b) Placing the said frozen cheese or the said frozen dairy mixture under vacuum at a pressure of between 0.1 and 100 mbar;

c) Heating the said frozen cheese or the said frozen dairy mixture under vacuum;
  c1) Phase 1: rapid increase in the temperature of the said cheese or of the said dairy mixture up to a temperature of the order of 110-120° C., in 0.2 to 2 hours, at a pressure of between 0.1 and 100 mbar and a water vapour extraction stream of 0.4 to 10 kg of water per kg of cheese or of dairy mixture and per hour; and
  c2) Optionally, phase 2: cooking at a temperature of between 60 and 160° C., at a pressure of between 0.1 and 100 mbar and from 5 to 60 minutes;

d) Cooling under vacuum, at a pressure of between 0.1 and 100 mbar, down to a temperature of between ambient temperature (15-20° C.) and 80° C. at a rate of decrease of the temperature of between 50 and 70° C. per hour;

e) Pressurizing by compensation of the vacuum with a dry gas, that is to say a gas having a moisture content of less than 3 ppm, preferably nitrogen gas.

Cheese is understood to mean a cooked pressed cheese or a cheese spread having a fat content of less than or equal to 40% by weight.

Mention may be made, among the low-fat cooked pressed cheeses which can be used in the process of the invention, of Fol Epi light, Leerdammer light, low-fat Emmental or Holland Cheese Master light.

The process according to the invention can also be employed with a cheese spread obtained from a mixture of cooked pressed cheeses, uncooked pressed cheeses, milk powder, casein powder, for example caseinate powder, dairy cream, and the like, optionally in the presence of less than 3% of melting salt, such as sodium citrate, or of another ingredient which facilitates the melting of the cheese.

The process according to the invention can also be implemented starting from a dairy mixture having a fat content of less than or equal to 40% by weight and obtained from a mixture of dairy products chosen from fresh curds, fresh cheese, soft cheese, milk powder, casein powder, for example caseinate powder, dairy cream, butter, and the like, optionally in the presence of less than 3% of melting salt, such as sodium citrate, or of another ingredient which facilitates the melting of the cheese. The dairy mixture must have a consistency which makes it possible to shape it into slices and to handle them.

According to a specific embodiment, the starting products, the cheese, including cheese spreads, or the dairy mixture, do not comprise carbohydrates of plant origin, such as starch or fibres.

According to an alternative form of the invention, the starting product, in particular when it is the cheese spread or the dairy mixture, can also comprise up to 5% by weight, with respect to the total weight of cheese or of dairy mixture, of flavourings, seasoning or inclusions for modifying the taste, the flavour and the final appearance of the finished product.

The advantage of the use of cheese spread or of the dairy mixture is that its preparation makes it possible to control and in particular to reduce the fat content of the finished product.

The cheese or the dairy mixture used preferably has a minimum $CO_2$ content of 5 mmol/kg; this minimum $CO_2$ content originates from a propionic fermentation which occurs during the manufacture of the said cheese or else from an incorporation of $CO_2$ during the manufacture of the said cheese or of the said dairy mixture, in a form of gas or of carbonate.

The pieces of cheese or of dairy mixture can have any geometrical shape as long as their thickness is less or equal than 4 mm; the dimensions of these pieces will preferably be such that the dry cheese or dairy foodstuff obtained can be ingested in one or two mouthfuls, that is to say being framed within a rectangle having a width of between 0.1 and 3 cm and preferably between 1 and 3 cm and a length of between 0.1 and 11 cm and preferably between 1 and 10 cm.

Figure 6:
FIG. 6 is a photograph of foodstuffs according to the invention having a complex shape.

One advantage of the process according to the invention is that it can be employed with pieces of cheese or of dairy mixture having a complex geometrical shape comprising, for example, concave parts, indeed even hollows or scooped-out parts, such as, for example, shapes of clover leaves, of bones, of rings, and the like, including divisible shapes; these complex shapes are illustrated in FIG. 6.

The preparation of the pieces of cheese can, for example, be carried out by cutting a cheese up into slices and then cutting out with a hollow punch.

When the starting product is a cheese spread or a dairy mixture, it is formed at a temperature of between 45 and 120° C., preferably between 45 and 90° C., and then either passed through a die having the desired shape (extrusion) and cut into pieces having a thickness of less than or equal to 4 mm or cast flat over a thickness of less than or equal to 4 mm and then cut out with a hollow punch.

The process according to the invention comprises two alternative forms suited to the starting product, cheese or dairy mixture, with the aim of preparing finished products having very similar characteristics in terms of three-dimensional shape and of crunchiness but for which the taste and the colour can be modified, thus making it possible to offer ranges of finished products.

Thus, the invention is based in particular on the development of a process which makes possible an expansion of the starting product, cheese or dairy mixture, by virtue of a rapid heating, under vacuum, of the frozen pieces of cheese or of dairy mixture (stage c1).

According to one of the alternative forms of the process, the latter also comprises a stage c2 which is a cooking phase during which the taste of the product develops; this alternative form is preferably employed when the starting product is a cheese or a cheese spread.

The temperature and pressure set points applied during the treatment phase c2 make it possible to adjust the sensory quality of the finished product: colour, texture, flavouring, as a function of the desired target. These set points can be variable over time.

According to another alternative form, the process according to the invention can be carried out without the cooking stage c2; this alternative form is implemented in the case where it is not desirable to obtain a colouration of the finished product or the development of a "cooked" taste, in particular when it is desired to prepare a product having the colour of the starting cheese or of the starting dairy mixture. This alternative form is particularly suitable for the preparation of a white or very pale finished product starting from a dairy mixture.

Figure 2:
Figure 3:
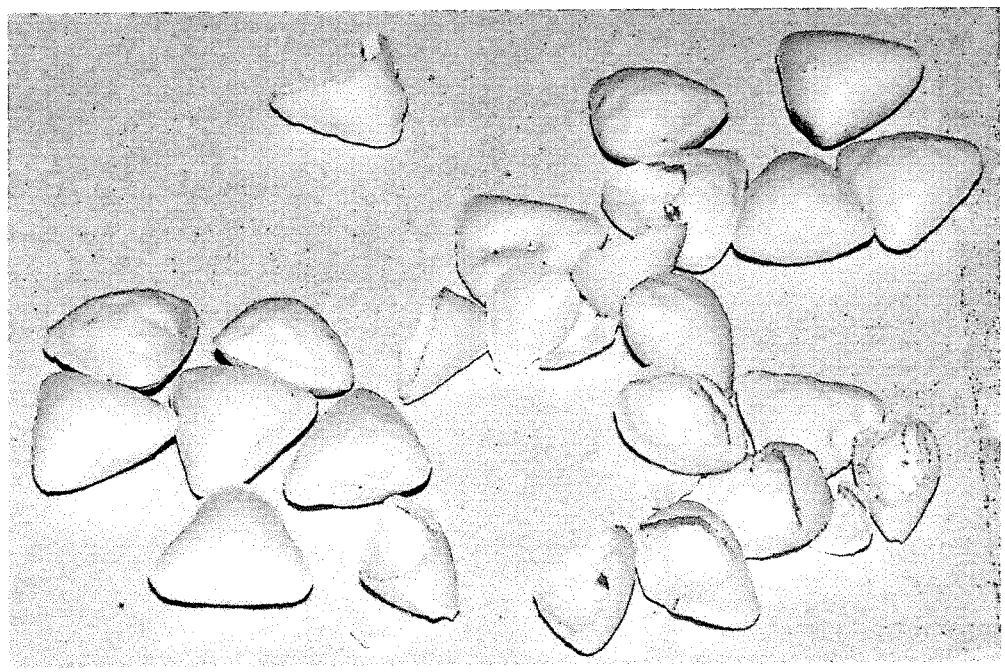
FIG. 3 shows a cross section of a dry cheese foodstuff; this photograph clearly shows the hollow and expanded shape of the said product.
Figure 5:
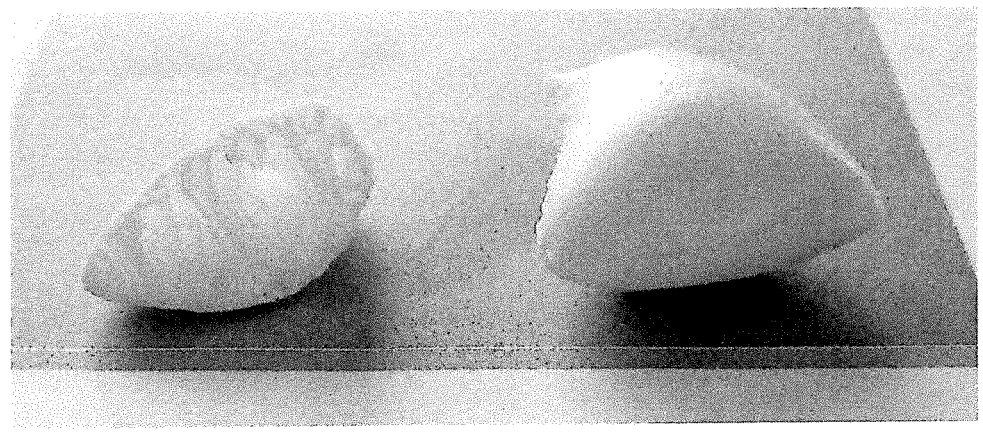
FIG. 5 is a photograph of dry dairy foodstuffs according to the invention having a triangular profile, the interior of which is partially hollow.

From a geometrical viewpoint, the dry cheese or dairy foodstuff obtained by this process is characterized by dimensions within the same ranges and a shape similar to those of the pieces used as starting product in the process according to the invention; the process confers, on the product, a three-dimensional expanded shape, that is to say that it exhibits a slightly embossed, preferably smooth, porosity-free continuous external surface with two convex faces and fused edges and that it is hollow, either completely hollow or partially hollow with numerous enlarged cavities; examples of this characteristic structure of the finished products are represented in FIGS. 1 and 2, which respectively show pieces having a rectangular profile and pieces having a triangular profile; FIG. 3 also illustrates the hollow shape of the product according to the invention; for its part, FIG. 5 represents pieces having a triangular profile, the interior of which is partially hollow; finally, FIG. 6 illustrates snacks according to the invention having complex shapes, in particular divisible complex shapes; according to a specific embodiment of the invention, the dry cheese or dairy foodstuff according to the invention has a divisible complex shape (for example a clover leaf shape).

The finished product obtained according to the process is distinguished in particular from the existing foodstuffs by:
 the appearance of their surface: the existing products have a surface which is highly irregular, porous or granular, comprising numerous bulges and often holes, whereas the surface of the foodstuff according to the invention is uniform and smooth, and
 their hollow structure, which is completely or partially scooped out, that is to say that their interior is composed of a single cavity or of several large cavities, whereas the existing foodstuffs are solid with a multitude of small cavities which do not communicate with one another (dry foamy texture).

In terms of composition, the dry cheese foodstuff is a lyophilized dairy product characterized by:
 a low water activity ($a_w$), that is to say a water activity of between 0.1 and 0.4;
 a cheese taste originating from the natural flavours of the cheese used;
 a protein/fat ratio by weight which has been retained, with respect to the starting product.

For its part, the dry dairy foodstuff is a lyophilized dairy product, obtained from a dairy mixture, characteried by:
 a low water activity ($a_w$), that is to say a water activity of between 0.1 and 0.4;
 a protein/fat ratio by weight which has been retained, with respect to the starting product;
 a neutral milky taste, if no flavouring is added to it.

Alternatively, due to its neutral taste, the dry dairy foodstuff can be flavoured by adding a savoury and/or sweet flavouring during the preparation of the dairy mixture; as indicated above, this addition does not represent more than 5% by weight, with respect to the total weight of the starting product; a person skilled in the art will know how to combine and proportion the flavouring or flavourings according to the effect desired.

Finally, at the organoleptic level, the dry cheese or dairy foodstuff is characterized by a very crunchy texture, demonstrated in sensory tests by comparison with reference products (see Example II below).

The finished product exhibits the advantage of being able to be consumed directly without other treatment and in particular without seasoning. It is thus a product without added fat or added salt which exhibits the same nutritional value as the cheese or the dairy mixture from which it is manufactured (that is to say that it comprises the same amount of salt and of fat as the starting product); in particular, it is possible to prepare dry cheese or dairy foodstuffs having a high content of proteins, that is to say of greater than or equal to 30% by weight, preferably of greater than or equal to 50% by weight and more preferably of greater than or equal to 60% by weight of total proteins, with respect to the total weight of the product. In addition, the product according to the invention has a very low content of carbohydrates and represents a better nutritional contribution than snacks based on carbohydrates and crisps.

Likewise, by virtue of the control of the composition of the dairy mixture used for the preparation of the dry dairy foodstuff, it is possible to prepare a product of solely dairy origin having limited contents of fat and of salt. While the process according to the invention makes possible the preparation of a finished product having a low content of carbohydrates, it can also be advantageous to modify the recipe of the starting dairy mixture by replacing fat with carbohydrates in order to reduce the calorific contribution of the finished product.

The dry cheese or dairy foodstuffs according to the invention can be consumed alone or as an accompaniment in dishes such as soups or salads; they can also be consumed after dipping in a pasty preparation of guacamole, houmous or taramasalata type.

The use of the dry cheese or dairy foodstuffs according to the invention is not limited to human food but can also relate to animal feed.

Example I—Preparation of a Dry Cheese Foodstuff According to the Invention

Figure 4:
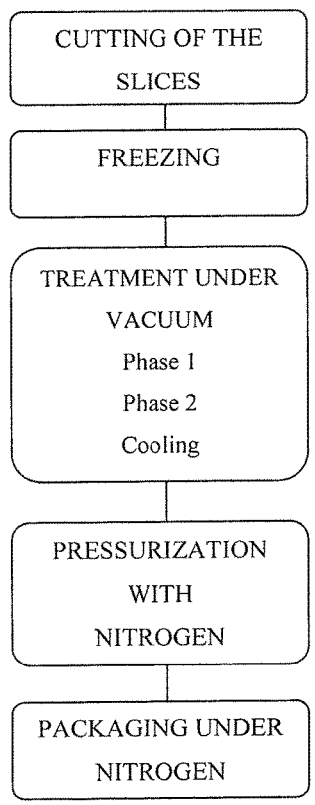
FIG. 4 shows a treatment diagram for the preparation of a dry cheese foodstuff according to the invention.

With reference to FIG. 4, a treatment diagram for the preparation of a dry cheese foodstuff according to the invention is provided.
Implementation Pieces of cheese of triangular shape having rounded ends, with a side length of approximately 25 mm, as slices with a thickness of approximately 1 mm, are prepared from low-fat cooked pressed cheese of Fol Epi Light type.

The pieces are positioned on 39×48 cm sheets and placed in a freezer at −55° C. for 2 hours.

The sheets of frozen cheese are placed in a freeze dryer.

A programming table makes it possible to carry out the desired treatment phases:
  Automatically launching the heating cycle after reaching the target pressure of 0.2 mbar in the treatment chamber;
  A Rapid bringing to temperature of the heating resistors at 120° C. (0 to 30 min);
  Maintaining the heating temperature at 120° C. for 1 hour;
  Cooling to 60° C., after 1 hour;
  Bringing to atmospheric pressure by addition of nitrogen.

Example II—Evaluation of the Crunchiness of a Dry Cheese Foodstuff According to the Invention The sensory impression of crunchiness of the dry cheese foodstuff manufactured according to Example I is evaluated by a panel of judges in comparison with commercial snacks.

The commercial snacks tested include Benenuts natural taste "3D Bugles", Belin cheese "P'tit Belin", Tuc Original "Mini Snackies" and Kellogg's Original "Pringles".

The following were evaluated by the judges:
  the overall impression of crunchiness perceived while consuming the piece of product tested:
The dry cheese foodstuff according to the invention and "3D Bugles" were perceived as the crunchiest products as overall impression; the results obtained for these two products are not significantly different.
  the number of times the product tested is successively chewed during which a significant noise is perceived;
The descriptor of the noise presents a classification of the products similar to that of the overall impression of crunchiness and the two products having the highest score are the dry cheese foodstuff according to the invention and "3D Bugles" (no significant difference between these two products).

It emerges from these sensory studies that the dry cheese foodstuff according to the invention can be described as very crunchy since it is classified equal with the crunchiest market product tested.

Example III—Preparation of Dry Cheese Foodstuff According to the Invention

Preparation of a cheese spread according to the following composition:

| Component | Content (%) |
| --- | --- |
| Fol Epi light | 50 |
| Edam 30 | 20 |
| Crème fraîche | 10 |
| Calcium caseinate | 3 |
| Skimmed milk powder | 4 |
| Sodium citrate | 2.2 |
| Calcium carbonate | 0.3 |
| Water | 10.5 |

Preparation of a strip with a thickness of approximately 1 mm which is cut into triangular shapes having rounded ends, with a side length of approximately 25 mm.

The treatment diagram is the same as for Example I, represented in FIG. 4.

The pieces are positioned on 39×48 cm sheets and placed in a freezer at −55° C. for 2 hours.

The sheets of frozen cheese are placed in a freeze dryer.

A programming table makes it possible to carry out the desired treatment phases:
  Automatically launching the heating cycle after reaching the target pressure of 0.2 mbar in the treatment chamber;
  Rapid bringing to temperature of the heating resistors at 120° C. (0 to 30 min);
  Maintaining the heating temperature at 120° C. for 1 hour;
  Cooling to 60° C., after 1 hour;
  Bringing to atmospheric pressure by addition of nitrogen.

Example IV—Preparation of a Dry Dairy Foodstuff According to the Invention

Preparation of a dairy mixture according to the following composition:

| Component | Content (%) |
| --- | --- |
| Fresh curds | 54 |
| Casein powder | 20 |
| Butter | 14 |
| Crème fraîche | 10 |
| Sodium citrate | 1.7 |
| Calcium carbonate | 0.3 |

Preparation of a strip with a thickness of approximately 1 mm which is cut into triangular shapes having rounded ends, with a side length of approximately 25 mm.

The treatment diagram is the same as for Example I, represented in FIG. 4.

The pieces are positioned on 39×48 cm sheets and placed in a freezer at −55° C. for 2 hours.

The sheets of frozen dairy mixture are placed in a freeze dryer.

A programming table makes it possible to carry out the desired treatment phases:

Automatically launching the heating cycle after reaching the target pressure of 0.6 mbar in the treatment chamber;

Rapid bringing to temperature of the heating resistors at 110° C. (0 to 30 min);

Maintaining the heating temperature at 110° C. for 10 minutes;

Cooling to 20° C., after 40 minutes;

Bringing to atmospheric pressure by addition of nitrogen.

The invention claimed is:

1. Process for the manufacture of a dry cheese or dairy foodstuff comprising the following stages:
    a) Freezing a cheese or a dairy mixture down to a temperature of less than or equal to −20° C.; the said cheese or the said dairy mixture has a fat content of less than or equal to 40% by weight and is prepared beforehand in slices having a thickness of less than or equal to 4 mm;
    b) Placing the said frozen cheese or the said frozen dairy mixture under vacuum at a pressure of between 0.1 and 100 mbar;
    c) Heating the said frozen cheese or the said frozen dairy mixture using conventional heat transfer heating under vacuum as follows:
        c1) Phase 1: rapid increase in the temperature of the said cheese or of the said dairy mixture up to a temperature within the range of 110-120° C., in 0.2 to 2 hours, at a pressure of between 0.1 and 100 mbar and a water vapour extraction stream of 0.4 to 10 kg of water per kg of product and per hour; and
        c2) Optionally, phase 2: cooking at a temperature of between 60 and 160° C., at a pressure of between 0.1 and 100 mbar and from 5 to 60 minutes;
    d) Cooling under vacuum, at a pressure of between 0.1 and 100 mbar, down to a temperature of between 15° C. and 80° C. at a rate of decrease of the temperature of between 50 and 70° C. per hour;
    e) Pressurizing by compensation of the vacuum with a dry gas, that is to say a gas having a moisture content of less than 3 ppm to obtain a dry cheese or dairy foodstuff that is characterized by:
        a water activity ($a_w$) of between 0.1 and 0.4;
        a dimension such that its width is between 0.1 and 3 cm and its length is between 0.1 and 11 cm;
        a porosity-free continuous external surface;
        an expanded, hollow or partially hollow, three-dimensional shape with two convex faces and fused edges; and
        a crunchy texture.

2. Process according to claim 1, wherein the said cheese or the said dairy mixture has a minimum $CO_2$ content of 5 mmol/kg.

3. Process according to claim 1, wherein the said cheese is a light cooked pressed cheese or a cheese spread.

4. Process according to claim 1, wherein the said cheese is chosen from Fol Epi light, Leerdammer light, low-fat Emmental or low-fat Holland Cheese Master.

5. Process according to claim 3, wherein the said cheese spread is obtained from a mixture of cooked pressed cheeses, uncooked pressed cheeses, milk powder, casein powder, dairy cream, optionally in the presence of less than 3% of melting salt or of another ingredient which facilitates the melting of the cheese.

6. Process according to claim 3, wherein the said cheese spread comprises one or more flavourings, seasoning or inclusions at a level of 5% by weight, with respect to the total weight of the said cheese spread.

7. Process according to claim 1, wherein the process is implemented with a dairy mixture obtained from a mixture of dairy products chosen from fresh curds, fresh cheese, soft cheese, milk powder, casein powder, dairy cream, butter, optionally in the presence of less than 3% of melting salt or of another ingredient which facilitates the melting of the cheese.

8. Process according to claim 1, wherein the said dairy mixture comprises one or more flavourings, seasoning or inclusions at a level of 5% by weight, with respect to the total weight of the said dairy mixture.

9. Dry cheese foodstuff obtained by the process according to claim 1.

10. Dry dairy foodstuff obtained by the process according to claim 1.

* * * * *